No. 855,964. PATENTED JUNE 4, 1907.
G. W. McLAUGHLIN.
GAGE.
APPLICATION FILED JAN. 22, 1907.
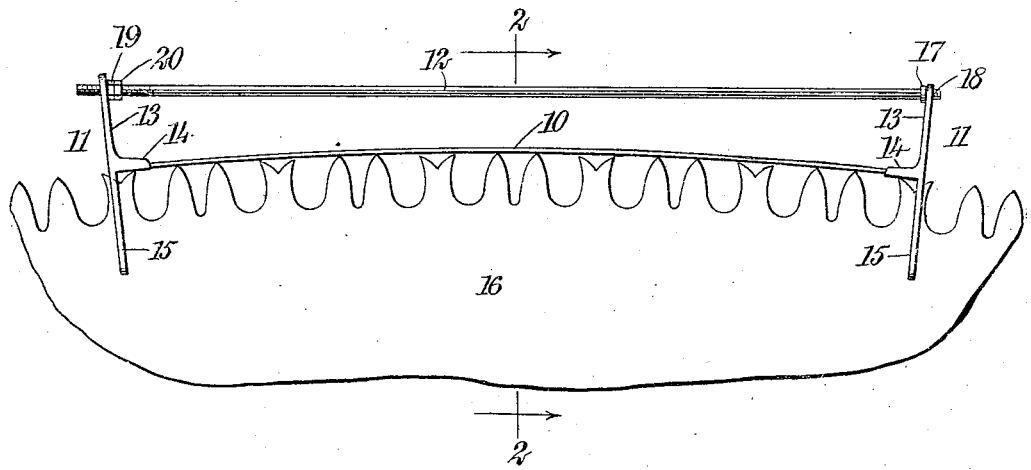
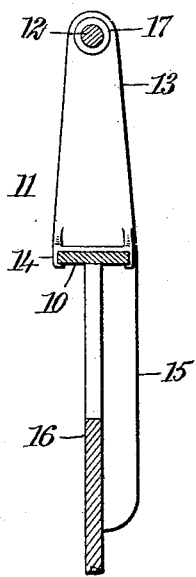
WITNESSES
INVENTOR
George W. McLaughlin
BY
ATTORNEYS

UNITED STATES PATENT OFFICE.

GEORGE W. McLAUGHLIN, OF HOQUIAM, WASHINGTON.

GAGE.

No. 855,964. Specification of Letters Patent. Patented June 4, 1907.

Application filed January 22, 1907. Serial No. 353,432.

*To all whom it may concern:*

Be it known that I, GEORGE W. McLAUGHLIN, a citizen of the United States, and a resident of Hoquiam, in the county of Chehalis and State of Washington, have invented a new and Improved Gage, of which the following is a full, clear, and exact description.

My invention relates to gages of the type adapted for discovering irregularities in the cutting edges of saws, and it is an object of this invention to provide a gage which is particularly adapted for use in gaging saws with curved cutting edges, such as cross-cut saws, and the like.

The invention consists in the novel construction and combination of parts, as is hereinafter described and indicated in the claims.

Reference is to be had to the accompanying drawings forming a part of this specification, in which similar characters of reference indicate corresponding parts in both the views.

Figure 1 is a view of my gage applied to a portion of a saw blade; and Fig. 2 is an enlarged cross section taken on the line 2—2 of Fig. 1.

My gage consists essentially of a resilient plate 10, secured at opposite ends in end pieces 11, and adapted to be set to any desired curve by means of the brace rod 12. The plate 10 may be of any desired length, but should be of uniform width and thickness throughout, so that when it is bent it will form a regular curve. The end pieces 11 each consist of an upright member 13, which is formed at its lower end with a member 14 extending at right angles thereto. The member 14, is recessed (as best shown in Fig. 2) to receive an end of the plate 10 which is swaged or otherwise secured to the member 14. Each member 13 is also formed with a guide piece 15 which depends below the member 14. This guide piece is not as wide as the member 13, and is offset so that when the gage is on a saw blade 16 with the guides 15 bearing against the face of the saw blade, the plate 10 will lie approximately central on the teeth of the saw.

The upper end of each member 13 is apertured to receive the rod 12. At one end this rod is secured to one of the side pieces 11, by means of a collar 17 which bears against the inner face of the adjacent member 13, and a pin 18 therein which bears against the outer face of said member 13. The opposite end of the rod 12 is threaded to engage a set nut 19 which bears against the inner face of the other member 13, and to engage a jam nut 20 adapted to lock the set nut 19 at any desired adjustment.

In practice the gage can be set to any desired curve by screwing the nut 19 against the adjacent member 13, thus spreading apart the upper ends of the end pieces 11 and flexing the plate 10. It will be evident that the farther apart the ends of the end pieces are spread, the smaller will be the radius of the arc described by the plate 10. When the gage has been set to the desired curve, it is placed on the saw with the plate 10 resting on the teeth of the saw. This will reveal any irregularities in the curving of the saw blade, and the teeth of the saw can be filed down until every tooth within the scope of the gage is in contact with the gage plate 10.

Having thus described my invention, I claim as new and desire to secure by Letters Patent:

1. In a gage for saws, a resilient gage plate, two end pieces, one at each end of said plate secured rigidly thereto, each end piece being formed with a member projecting at an angle to the face of said plate, each member being formed with an aperture, a rod adapted to enter said apertures, said rod being formed with a threaded portion at one end, a pin projecting from said rod at the other end thereof and adapted to engage one side of one of said members, a collar on said rod adapted to engage the other side of said last-mentioned member, a set nut on said threaded portion of said rod adapted to bear against the other of said members, and a lock nut adapted to engage said set nut.

2. In a gage for saws, a resilient gage plate, two members rigidly secured to said plate one at each end thereof and each member being formed with a portion projecting above said plate and a portion projecting below said plate, a rod attached at one end to the upper portion of one of said members, said rod being threaded at the other end, and a nut mounted on said threaded end of said rod and adapted to bear against the upper portion of the other of said members on the inner side thereof, the lower portions of said members being offset to serve as guides for a saw blade.

In testimony whereof I have signed my name to this specification in the presence of two subscribing witnesses.

GEORGE W. McLAUGHLIN.

Witnesses:
A. S. HODGDEN,
M. A. BRISCO.